United States Patent [19]

Uchida et al.

[11] Patent Number: 4,524,401
[45] Date of Patent: Jun. 18, 1985

[54] MAGNETIC TRANSDUCER HEAD UTILIZING MAGNETO RESISTANCE EFFECT WITH A BIAS FIELD AND PARTIAL SATURATION

[75] Inventors: Hiroyuki Uchida; Takehiro Nagaki, both of Yokohama; Shigeyoshi Imakoshi, Atsugi; Yutaka Soda, Yokohama; Junkichi Sugita, Ebina; Tetsuo Sekiya, Yokohama, all of Japan

[73] Assignee: Sony Corporation, Tokyo, Japan

[21] Appl. No.: 333,423

[22] Filed: Dec. 22, 1981

[30] Foreign Application Priority Data

Dec. 26, 1980 [JP] Japan ................ 55-186502

[51] Int. Cl.$^3$ ............................. G11B 5/30
[52] U.S. Cl. ................................... 360/113
[58] Field of Search .......................... 360/113

[56] References Cited

U.S. PATENT DOCUMENTS

| | | | |
|---|---|---|---|
| 3,493,694 | 2/1970 | Hunt | 360/113 |
| 3,881,190 | 4/1975 | Brock et al. | 360/113 |
| 3,887,944 | 6/1975 | Bajorek et al. | 360/113 |
| 4,141,051 | 2/1979 | Kuijk et al. | 360/113 |

*Primary Examiner*—Raymond F. Cardillo
*Attorney, Agent, or Firm*—Hill, Van Santen, Steadman & Simpson

[57] ABSTRACT

A magnetic transducer head utilizing a thin film magneto-resistance effect element is disclosed in which the amount of a DC bias magnetic field is so selected that only the end portion of the thin film magneto-resistance effect element serving as a contact surface with a magnetic medium is effectively given with sensitivity and the element is saturated in the vicinity of its central portion in its width direction.

11 Claims, 15 Drawing Figures

MAGNETIC TRANSDUCER HEAD UTILIZING MAGNETO RESISTANCE EFFECT WITH A BIAS FIELD AND PARTIAL SATURATION

BACKGROUND OF THE INVENTION

1. Field of the Invention

This invention relates to a playback magnetic head and particularly to a magneto resistance effect type magnetic head having a thin film magneto-resistance effect element.

2. Description of the Prior Art

A magneto resistance effect type magnetic head is generally formed by using a material having a magneto-resistance effect (hereinafter simply referred to as MR effect) such as a magnetic alloy thin film formed of a material such as Ni-Fe(Nickel - Iron) system alloy or Ni-Co (Nickel - Cobalt) system alloy. The alloy thin film having the MR effect is formed on a nonmagnetic substrate like, for example, a sapphire, having a predetermined width equivalent to a reproduced track width in which a film thickness is several hundreds Å and a length is several tens to several hundreds $\mu$m thereby composing a magnetic sensor portion of the MR head. In the MR type magnetic head, a contact surface thereof facing a magnetic recording medium is adapted to be formed by one end surface of the thin film MR element, and a direction of transport or scanning direction of the recording medium relatively to the magnetic head is adapted to correspond to a film thickness direction of the thin film MR element.

It is said in general that the playback magnetic head of the MR effect type can obtain a higher sensitivity upon reproducing a narrow track, a short wavelength and a reproduction with an ultra low speed as compared with a normal electro-magnetic induction type playback head.

However, in the MR effect type playback magnetic head of this sort, a response characteristic upon reproducing the short wavelength is not always improved sufficiently in practice. It may be considered that the reason is mainly because a blind portion exists in the vicinity of the contact portion of the thin film MR element with the magnetic recording medium so as to prevent the MR effect from being satisfactorily demonstrated, by which the response characteristic upon reproducing the short wavelength is lowered.

There is provided a thin film MR element 1 patterned like a band shape as illustrated in FIG. 1. If a current I flows in a longitudinal direction thereof and an uniform magnetic field H is applied thereto in a direction to intersect the direction of the current I as well as in a direction to extend along a film surface of the MR effect element 1, a resistance change $\Delta 92$ of the MR effect element 1 relative to the applied magnetic field H, and accordingly an output $\Delta e$ thereof shows a characteristic as represented by a curve 2 in FIG. 2, in other words, a symmetrical characteristic with respect to the magnetic field $\pm H$. In this case, if a signal magnetic field denoted by reference numeral 3 in FIG. 2 is applied to the MR effect element 1 from the magnetic recording medium under the condition that a bias magnetic field is not applied thereto, an output signal designated by a reference numeral 4 in FIG. 2, a polarity of which can not be identified, is produced as an output of the MR effect element 1.

To cope with the above aspect, it is arranged that the MR type magnetic playback head of this kind is operated under the condition that the MR effect element is supplied with predetermined DC(Direct Current) bias magnetic field $H_B$ as shown in FIG. 3 so as to produce for an input signal magnetic field applied thereto and designated by a reference numeral 3' in FIG. 3 an output signal represented by reference numeral 4' in FIG. 3 in which the polarity of the input signal magnetic field can be discriminated is produced.

On the other hand, referring in particular to a distribution of a demagnetizing field in the aforesaid thin film MR effect element 1, a strength of the demagnetizing field with respect to the widthwise direction of the MR effect element 1 is lowered at the center of the widthwise direction of the MR effect element 1 but raised higher at both end surfaces 1a and 1b thereof as seen in FIG. 4. Accordingly, if a film width w of the MR effect element 1, i.e., a distance w between one end surface 1a forming a side closely facing to a magnetic recording medium 5 and the other end surface 1b forming another side to oppose to the end surface 1a is selected, as for example, 5 $\mu$m, the film thickness of the MR effect element 1 is selected as 500 Å and the length thereof is selected as 60 $\mu$m and when the MR effect element 1 occupied by both end surfaces 1a and 1b is divided into regions as shown by respective broken lines $a_1$ to $a_5$ in FIG. 5 and the respective divided regions are represented as the first to sixth regions counted from the end surface 1a side, the characteristics of the resistance changes in the respective regions relative to the bias magnetic field $H_B$ are different from one other as illustrated in FIG. 6. In other words, as shown in FIG. 6, a curve 6 is employed to indicate a characteristic in the first and sixth regions, a curve 7 a characteristic in the second and fifth regions and a curve 8 is provided to indicate a characteristic in the third and fourth regions. More specifically, in the central region of the film width of the MR effect element 1, i.e., the third and fourth regions, as will be clear from FIG. 6, particularly when the film thickness of the MR element 1 is thin so as to make the demagnetizing field small or weak and a magnetic anisotropic field $H_K$ is further given as small, a magnetization is apt to be saturated by a relatively small magnetic field, by which the resistance change is urged to be saturated. On the contrary, the strength of the demagnetizing field is enlarged by an effect of an end edge in the first and sixth regions at the respective end surfaces 1a and 1b so that the magnetization is difficult to be saturated, thereby allowing the resistance change characteristic to demonstrate a wide range of a linearity.

But, an overall output of the MR effect element 1 is determined by the respective characteristics over the first to sixth regions thereof and hence in the prior art, the bias magnetic field is preset at a substantially central value of the magnetic field range in which the resistance change characteristic thereof can have the linearity in the overall characteristic. That is, the bias magnetic field is preset or selected to be relatively low or small value such as 150 to 200 Oe. Referring to the curve 6 as seen in FIG. 6, i.e., the first and sixth regions forming the sides of both end surfaces 1a and 1b in the MR effect element 1, such low bias magnetic field is forced to become the region in which the resistance change $\Delta \rho$ is quite small. Whereas, the more the signal magnetic field to be supplied to this MR effect element 1 becomes the short wavelength, the spacing loss becomes larger, whereby a proximity portion of the surface on the side to which the signal magnetic field is applied to the MR effect element 1, more specifically, a nearby region of the end surface 1a composing the contact surface side with the magnetic medium 5, i.e., only the first region as set forth above serves for reproduction. But, in this first region, the resistance change characteristic becomes the characteristic shown by the curve 6 in FIG. 6. Since the bias magnetic field is not properly selected with respect to the first region previously mentioned, it is apparent that the short wavelength characteristic of the MR effect type playback magnetic head of this kind is not sufficiently improved as already mentioned in the beginning.

Although an improvement of such short wavelength characteristic is realized to a certain extent by making the film width of the MR element, for example, small, it is impossible to form the film width thereof sufficiently small in a view point of obtaining a long life of the MR element, considering the abrasion thereof due to a sliding with the magnetic recording medium.

OBJECTS AND SUMMARY OF THE INVENTION

Accordingly, it is an object of this invention to provide a magnetic transducer head utilizing magnetic-resistance effect which is free from the aforesaid defects and capable of improving the characteristic of the short wavelength signal reproduction.

It is another object of this invention to provide a magnetic transducer head utilizing magneto-resistance effect which can satisfactorily enlarge the film width thereof, free from the influence on the characteristic.

It is further object of this invention to produce a magnetic transducer head utilizing magneto-resistance effect which can be utilized for a long period as the magnetic head with high sensitivity and superior frequency characteristic.

According to an aspect of the present invention, there is provided a magneto-resistance effect type magnetic head including a thin film magneto-resistance having means for supplying effectively a sensitivity to film end portions forming contact surfaces closely facing to a magnetic medium of said thin film magneto-resistance element and means for selecting a bias magnetic field amount so as to saturate the nearby portion of a center of a film width.

The other objects, features and advantages of the present invention will become apparent from the following description taken in conjunction with the accompanying drawings through which the like references designate the same elements and parts.

DESCRIPTION OF THE PREFERRED EMBODIMENT

Figure 1:
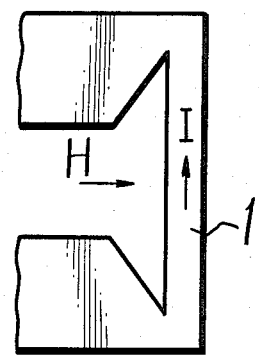
FIG. 1 is an enlarged plan view schematically showing a thin film magneto-resistance effect element.
Figure 2:
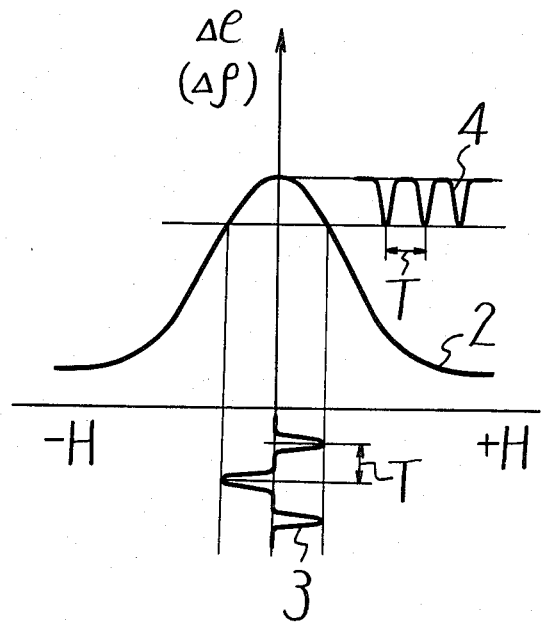
FIGS. 2 and 3 are graphs used to explain the respective characteristics and operations thereof.
Figure 3:
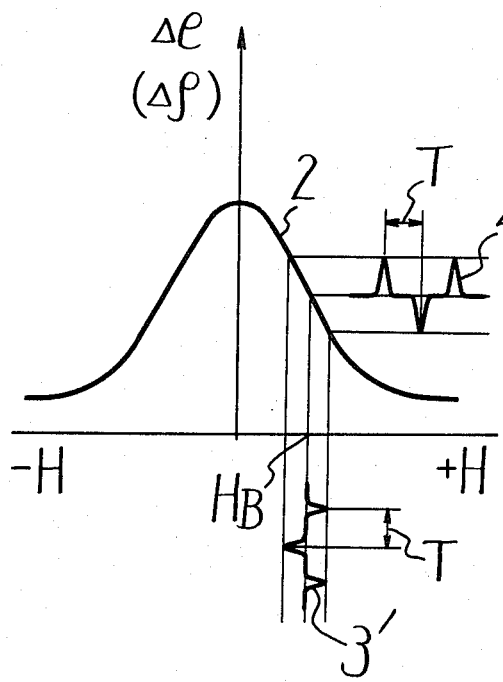
Figure 4:
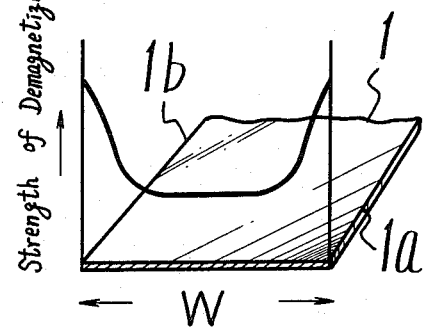
FIG. 4 is a demagnetizing field distribution graph used to explain thereof likewise.
Figure 5:
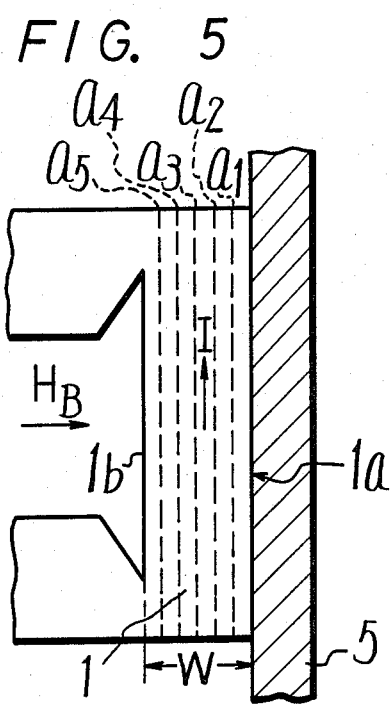
FIG. 5 is an explanatory enlarged plan view of the thin film magneto-resistance effect element.
Figure 6:
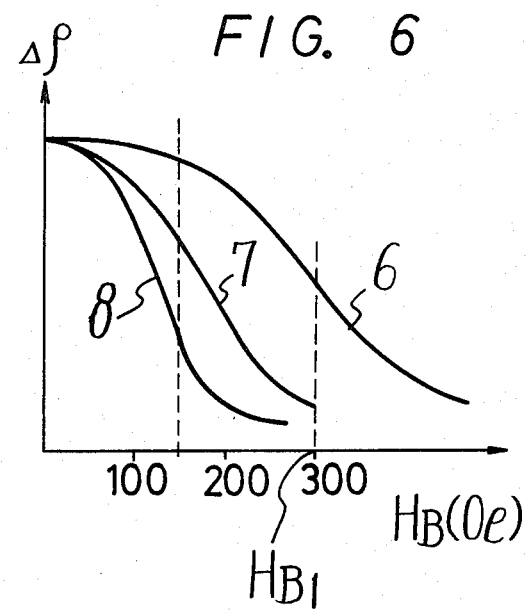
FIG. 6 is a characteristic graph thereof.

According to this invention, in a thin film MR element, the magnetization at the central portion of the film width thereof is adapted to be saturated by a bias magnetic field thereby permitting the thin film MR element to be operative always substantially only in the vicinity of the end surface of the thin film MR element, i.e., only in the vicinity of the contact surface side with a magnetic medium. To describe the embodiment of this invention further in detail, with respect to the thin film MR element, taking the film thickness and the characteristic of the material thereof such as the largeness of an anisotropic magnetic field and so on into considerations, the value of the bias magnetic field is so selected that the saturation of the resistance change by the external magnetic field at the central portion of the film widthwise direction of the thin film MR element may be remarkably caused, in other words, for example, the characteristic of the curve 8 as illustrated in FIG. 6 may become rapid or acute. More particularly, the bias value $HB_1$ of the bias magnetic field is selected to be a range from, for example, 250 to 300 Oe in such a manner that the bias magnetic field thereof may become the proper bias value relative to the characteristic in the vicinity of the end surface of the thin film MR element as shown by, for example, the curve 6 in FIG. 6, while the resistance change may be substantially saturated for the characteristic in the central portion of the widthwise direction of the thin film MR element as shown by, for example, the curve 8 in FIG. 6 and further in a certain case relative to the characteristic as shown by the curve 7 in FIG. 6.

Figure 7:
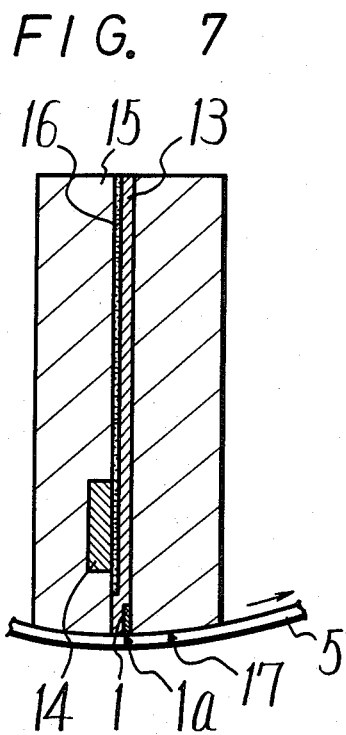
FIG. 7 is an enlarged sectional view of one embodiment of the magneto-resistance effect type magnetic head according to this invention.
Figure 8:
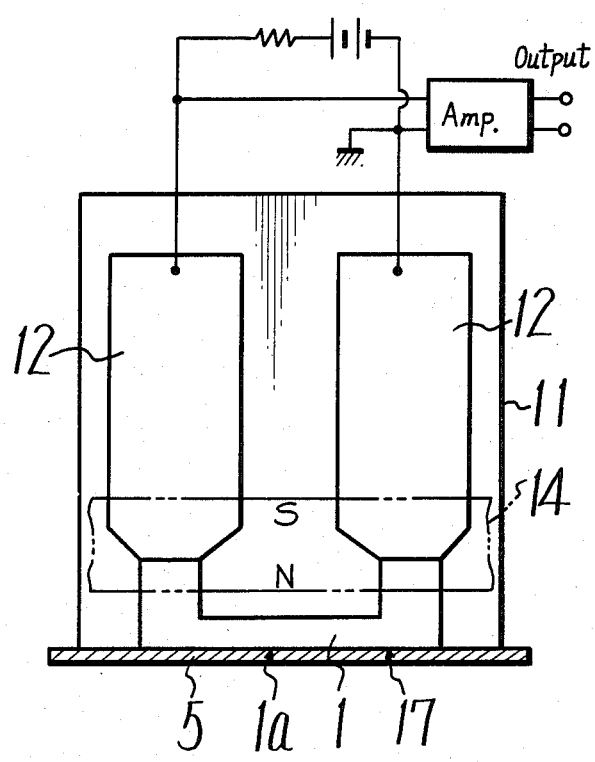
FIG. 8 is a plan view showing a state of the head shown in FIG. 7 in which an auxiliary upper plate thereof is removed.
Figure 9:
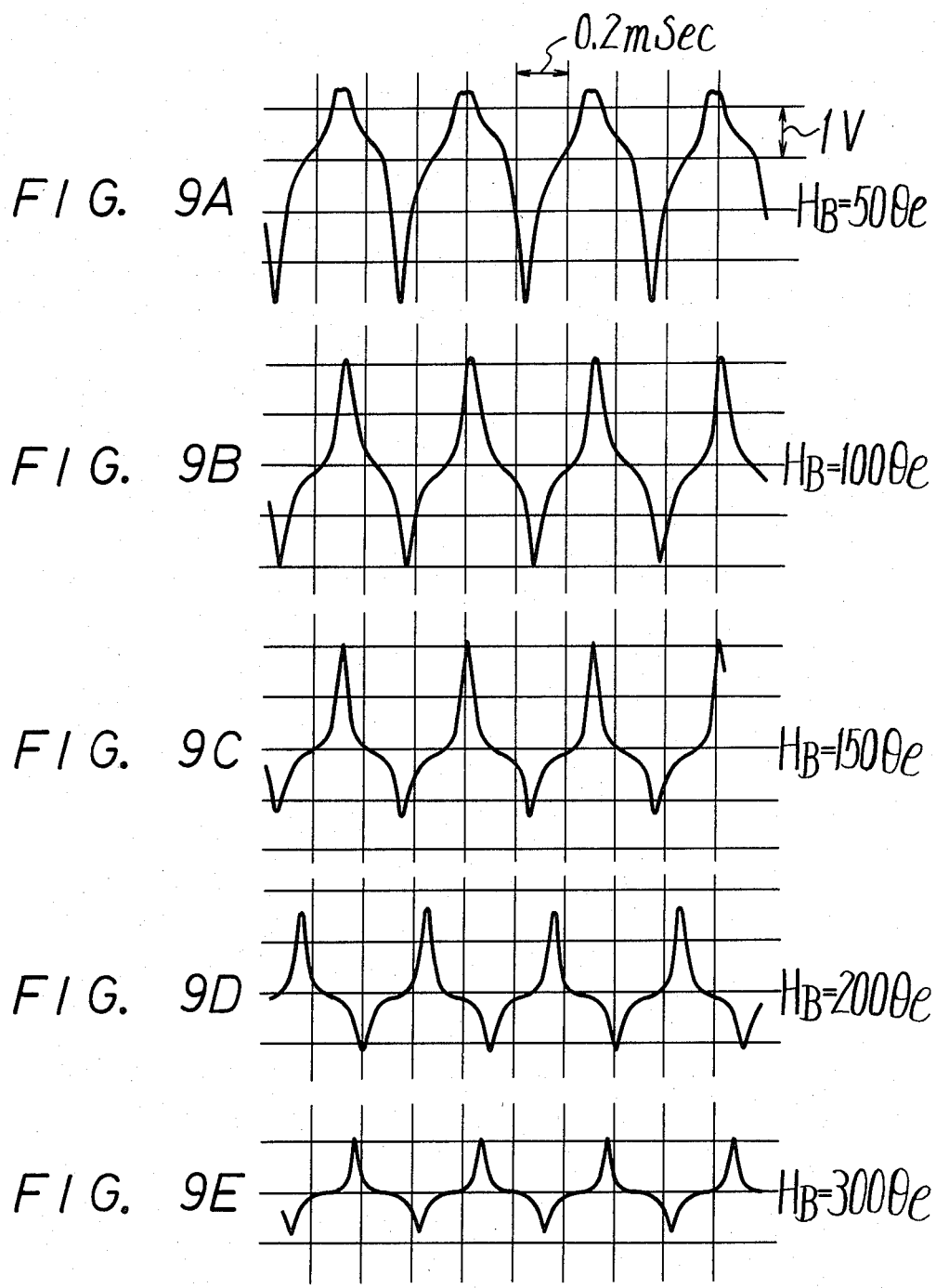
FIGS. 9A to 9E each are waveforms of reproduced outputs from the head shown in FIG. 7 showing a case where the bias magnetic field thereto is changed.

One embodiment of the magnetic transducer head utilizing magneto-resistance effect according to this invention will hereinafter be described with reference to FIGS. 7 and 8. The magnetic transducer head of this invention is also comprised of the thin film MR element 1 formed to be, for example, an U-shaped pattern which is foamed on a substrate 11 made of such as sapphire. At both ends of the MR element 1 is bonded a conductive layer with a good electric conductivity so as to form terminal members or portions 12. On the substrate 11 is further coated an insulating layer 13 such as $SiO_2$ (Silicon Dioxide) layer formed by, for example, a R.F (Radio Frequency) sputtering method so as to cover the portions of the element 1 and the terminal members thereof 12 in which a bias magnetic field generating means 14 composing a permanent magnet for generating a DC bias magnetic field is disposed, on which a reinforcing substrate 15 is further placed. Reference numeral 16 denotes adhesive material provided in order to adhere the magnet 14 and the reinforcing substrate 15 to each other. Reference numeral 17 represents a contact surface of the transducer head with the magnetic medium 5 which is finished like a mirror surface to which an end surface 1a of the element 1 is faced.

Particularly, in the embodiment of this invention, a strength of the magnetic field against the element 1 generated by the bias magnetic field generating means, that is, the permanent magnet 14 is selected in such a strength as 250 to 300 Oe that the strength may saturate the MR effect at the central portion remote from the end surface 1a in the film width direction of the element 1 and become the proper bias value as described previously. By applying such a strong bias magnetic field to the MR element, magnetization of the MR element at a central portion of the element, such as in 3rd and 4th regions is fixed along a direction of the bias magnetic field and no rotation of magnetization is caused upon receipt of signal magnetic field. While at the peripheral portion of the MR element such as, in 1st region, even under an application of such a strong bias magnetic field, magnetization of the MR element can rotate upon receipt of signal magnetic field from the magnetic recording medium due to the existence of demagnetizing field.

According to the afore-described magnetic transducer head, since the characteristic of the MR element 1, as shown by the curve 6 in FIG. 6, has a broad range of the linearity, with respect to the signal magnetic field of the short wavelength, the MR effect is substantially caused only in the vicinity of the end surface (in the vicinity of the contact surface 17 with the magnetic medium 5) to show a high sensitivity and the appropriate bias magnetic field is applied to the portion of the nearby end surface, it is capable of improving in particular the characteristic of the short wavelength.

FIGS. 9A to 9E each are waveform diagrams to show cases in which the bias magnetic field $H_B$ is selected respectively as 50 Oe, 100 Oe, 150 Oe, 200 Oe and 300 Oe in the magnetic transducer head with the arrangement described previously in FIGS. 7 and 8 and respective reproduced output waveforms at 2 kHz when the thin film MR effect element 1 thereof is comprised of a permalloy having a film width 5.0 μm and a current of 5.0 mA is applied thereto. As is apparent from such waveform diagrams, high resolution can be obtained at the bias magnetic field having a strength of about 300 Oe.

Figure 10:
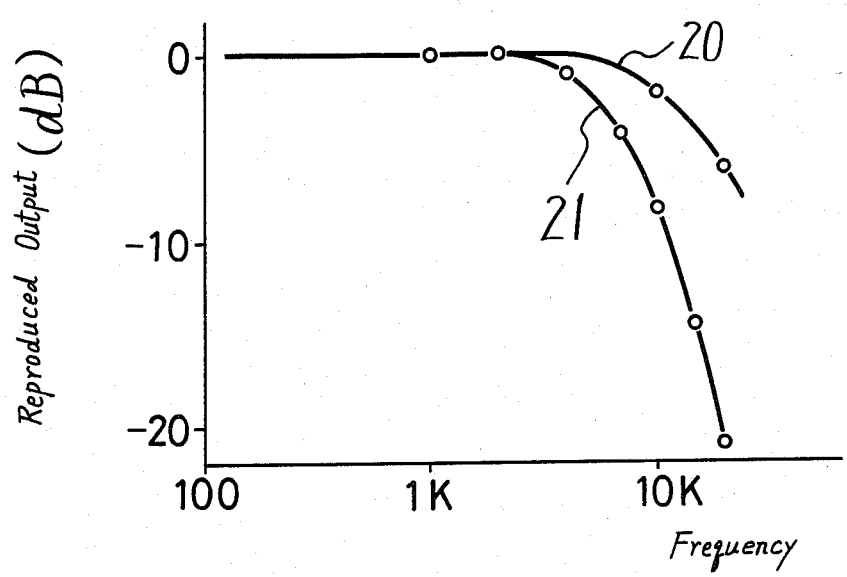
FIG. 10 is a frequency characteristic graph thereof.

Curves 20 and 21 as illustrated in FIG. 10 are provided to show respective frequency characteristics in cases where the value of the bias magnetic field $H_B$ is selected to be 300 Oe of a high value in the embodiment of this invention as mentioned previously and the normal values from 150 to 200 Oe, by which it is understood that the frequency characteristic is remarkably improved in the short wavelength side.

Figure 11:
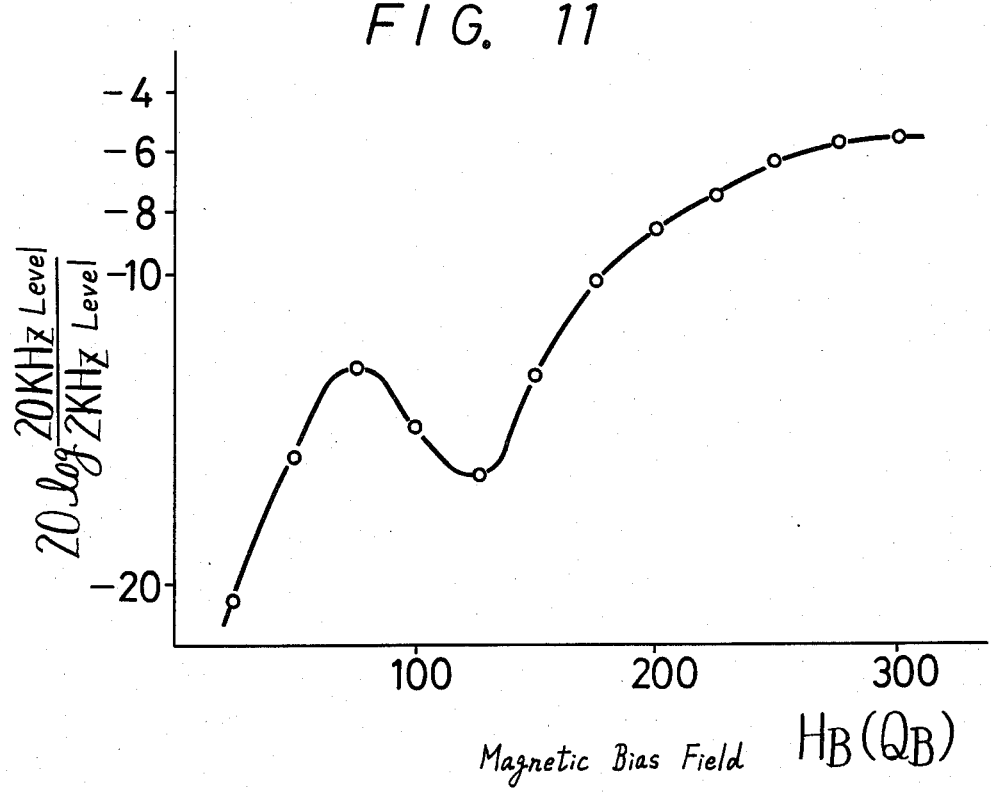
FIG. 11 is a graph of a bias magnetic field dependence of the frequency characteristic.

Further, FIG. 11 is a diagram showing a measurement result of a dependence of the frequency characteristic on the bias magnetic field in which the dependence thereof is measured by a ratio of each level in case of 20 kHz and 2 kHz. Also, it is understood that the frequency characteristic with small change in 2 kHz and 20 kHz, that is, the smooth or flat frequency characteristic is demonstrated at about 300 Oe of the high or strong bias magnetic field.

As described above, in accordance with the magnetic transducer head of this invention, since an influence on the widthwise direction of the thin film MR effect element 1 upon the central portion is positively or reliably removed, a bad influence of the central portion on the characteristic can be removed and therefore, free from the influence on the characteristic, the film width can be satisfactorily enlarged. Also, since the magnetic transducer head can be utilized over a long period even if the magnetic transducer head is abraded by the relative sliding in contact with the magnetic medium and the contact surface caused by the abrasion with the magnetic recording medium always is arranged as the surface with high sensitivity, the magnetic transducer head of this invention can be utilized for a long period as the magnetic head with high sensitivity and superior frequency characteristic.

The above description is given on preferred embodiments of the invention, but it will be apparent that many modifications and variations could be effected by one skilled in the art without departing from the spirit or scope of the novel concepts of the invention, so that the scope of the invention should be determined by the appended claims only.

We claim as our invention:

1. A magnetic transducer head utilizing magneto resistance effect, comprising:
   a thin film magneto resistance effect element having an elongated edge arranged to closely confront a record track of a magnetic recording medium for scanning coupling with a signal recorded on the record track, said elongated edge being elongated in a longitudinal direction,
   current supplying means connected with said element to produce a current flow in the longitudinal direction in said element,
   biasing means coupled with said element to apply a D.C. bias magnetic field to said element, and
   means comprising the configuration of said element and the disposition of said elongated edge relative to said biasing means such that a demagnetizing field is produced which is relatively intense in a first region of said element at said elongated edge and is relatively less intense in a second region of said element remote from said elongated edge, with said D.C. bias magnetic field being of a strength to saturate said element at the second region thereof while the first region remains sensitive to a signal magnetic field from said record track of the magnetic recording medium.

2. A magnetic transducer head according to claim 1 with a width dimension of said element at right angles to the longitudinal direction being at least about five micrometers.

3. A magnetic transducer head according to claim 1 with said biasing means having a first elongated magnetic pole relatively close to said element and generally parallel to said elongated edge and generally uniformly spaced therefrom, and 4. A magnetic transducer head according to claim 3 with a width dimension of said element at right angles to the elongated edge of said element being about five micrometers and the thickness of said element being about five hundred angstroms.

5. A magnetic transducer head according to claim 3 with said elongated edge having a length of about sixty micrometers and said first elongated magnetic pole having a length at least equal to the length of said elongated edge and being essentially at least coextensive with the length of said elongated edge.

6. A magnetic transducer head according to claim 5 with a width dimension of said element at right angles to the longitudinal direction being at least about five micrometers.

7. A magnetic transducer head utilizing magneto resistance effect, comprising:
   a thin film magneto resistance effect element having an elongated edge arranged to closely confront a record track of a magnetic recording medium for scanning coupling with a signal recorded on the record track, said elongated edge being elongated transverse to a scanning direction along the record track, current supplying means connected with said element to produce a current flow in said element, biasing means coupled with said element to apply a D.C. bias magnetic field to said element, and means comprising the disposition of said elongated edge relative to said biasing means such that a demagnetizing field is produced which is relatively intense in a first region of said element at said elongated edge and is relatively less intense in a second region of said element remote from said elongated edge, with said D.C. bias magnetic field being of a strength to saturate said element at the second region thereof while the first region remains sensitive to a signal magnetic field from said record track of the magnetic recording medium.

8. A magnetic transducer head according to claim 7, with said element having a thickness not greater than about five hundred angstroms and a width dimension at right angles to said elongated edge of at least about five micrometers.

9. A magnetic transducer head according to claim 7 with said biasing means having a first elongated magnetic pole relatively close to said element and generally parallel to said elongated edge and generally uniformly spaced therefrom, and having a second magnetic pole relatively remote from said element.

10. A magnetic transducer head according to claim 9 with a width dimension of said element at right angles to the elongated edge being at least about five micrometers.

11. A magnetic transducer head according to claim 10, with said element having a thickness of about five hundred angstroms.

* * * * *